United States Patent
Abhani et al.

(10) Patent No.: US 12,081,345 B2
(45) Date of Patent: Sep. 3, 2024

(54) AUTONOMOUS DETECTION OF STATUS OF LINK BETWEEN INITIATOR DEVICE AND TARGET DEVICE IN UFS SYSTEM

(71) Applicant: SAMSUNG ELECTRONICS CO., LTD., Suwon-si (KR)

(72) Inventors: Dipakkumar Prafulkumar Abhani, Bengaluru (IN); Vasudevan Subramaniam, Bengaluru (IN); Ken Joseph Kannampuzha, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 17/457,507

(22) Filed: Dec. 3, 2021

(65) Prior Publication Data

US 2023/0117858 A1      Apr. 20, 2023

(30) Foreign Application Priority Data

Oct. 14, 2021   (IN) .............................. 202141047003

(51) Int. Cl.
    *H04L 1/1867*      (2023.01)
    *G06F 13/42*       (2006.01)

(52) U.S. Cl.
    CPC .......... *H04L 1/188* (2013.01); *G06F 13/4286* (2013.01)

(58) Field of Classification Search
    None
    See application file for complete search history.

(56) References Cited

U.S. PATENT DOCUMENTS

| | | | |
|---|---|---|---|
| 7,707,346 B2 | 4/2010 | Deshpande et al. | |
| 7,792,014 B2 | 9/2010 | Tsang | |
| 10,203,896 B2 * | 2/2019 | Yoon | G06F 3/0604 |

(Continued)

FOREIGN PATENT DOCUMENTS

| | | |
|---|---|---|
| EP | 2359534 | 8/2011 |
| JP | 2011-039897 | 2/2011 |
| JP | 2011039897 A * | 2/2011 |

OTHER PUBLICATIONS

Anonymous, "Jedec Standard Universal Flash Storage (UFS) rev. 3.1", Jan. 2018 (Year: 2018).*

(Continued)

*Primary Examiner* — April Y Blair
*Assistant Examiner* — Matthew W Wahlin
(74) *Attorney, Agent, or Firm* — F. CHAU & ASSOCIATES, LLC

(57) ABSTRACT

A method and an initiator device for autonomous detection of status of a link between the initiator device and a target device in a Universal Flash Storage (UFS) system. The method includes determining whether an Acknowledgement and Flow Control (AFC) frame for a data frame is received before expiry of a turn-around timer. If the AFC frame is received from the target device before expiry of the turn-around timer, then the method detects the status of the link between the initiator device and the target device as active. If the AFC frame is not received from the target device before expiry of the turn-around timer then, the method detects the status of the link between the initiator device and the target device by restarting the turn-around timer with a second time period.

19 Claims, 10 Drawing Sheets

(56) References Cited

U.S. PATENT DOCUMENTS

2019/0042510 A1   2/2019  Ngau et al.

OTHER PUBLICATIONS

Extended European Search Report dated Feb. 17, 2023 in corresponding European Application No. 22188084.4 (9 pages).
Anonymous, "Universal Flash Storage(UFS), Version 3.1", Jedec Standard, Jedec—Jedec Solid State Technology Association, vol. JESD220E, Jan. 31, 2020, pp. 1-421, XP009541917.
Motiwala, "Configurable Design of PCI Express Data Link Layer Receiver", IJSRD—International Journal for Scientific Research & Development, vol. 2, Issue 03, 2014, ISSN (online): 2321-0613, pp. 1514-1517.

* cited by examiner

AUTONOMOUS DETECTION OF STATUS OF LINK BETWEEN INITIATOR DEVICE AND TARGET DEVICE IN UFS SYSTEM

CROSS REFERENCE TO RELATED APPLICATION

This application claims priority under 35 U.S.C. 119 to India application no. 202141047003 filed in the Indian Intellectual Property Office on Oct. 14, 2021, the content of which is incorporated herein by reference in its entirety.

FIELD

The present disclosure relates generally to data communications and more particularly to data communications within a Universal Flash Storage (UFS) system.

DISCUSSION OF THE RELATED ART

As per the UFS specification (e.g., version 3.1) published by the Joint Electron Device Engineering Council (JEDEC), when a data link layer of an initiator device transmits a data frame to a data link layer of a target device, the initiator device starts a replay timer with a dedicated time period (65535 us) per traffic data at the end of every data frame transmission. The replay timer serves to identify an Acknowledgement and Flow Control (AFC) frame or a Negative Acknowledgement (NAC) frame for the transmitted data frame received within the dedicated time period. If the AFC frame or NAC frame is not received within the dedicated time period, the initiator device assumes there is a problem with a link between the initiator device and the target device.

FIG. 1 shows a normal operating scenario in which an initiator device 100 transmits the data frame to a target device 200 and the initiator device 100 receives the AFC frame from the target device 200 before expiry of the replay timer, according to prior art. At S102, a transmitter 110 of the initiator device 100 transmits the data frame to the receiver 220 of the target device 200. After transmitting the data frame, the initiator device 100 starts the replay timer. At S104, the receiver 220 of the target device 200 receives the data frame and sends the AFC frame to a transmitter 210 of the target device 200. At S106, the transmitter 210 of the target device 200 sends the AFC frame to the transmitter 110 of the initiator device 100. Once the AFC frame is received at the initiator device 100, the initiator device 100 stops the replay timer. Consider a scenario, when the AFC frame is not received, at the initiator device 100, within the dedicated time period, the initiator device 100 waits for the expiry of the replay timer. After expiry of the replay timer, the initiator device 100 assumes there is a problem with the link between the initiator device 100 and the target device 200. Further, the initiator device 100 initiates a link re-initialization between the initiator device 100 and the target device 200 to transmit the data frame from the initiator device 100 to the target device 200. However, up to expiry of the replay timer, the initiator device 100 waits for the AFC frame from the target device 200. Hence, the initiator device 100 wastes the power and resources (e.g., bandwidth). This problem is explained with reference to FIG. 2.

FIG. 2 shows a problem scenario in which the initiator device 100 transmits the data frame to the target device 200 and the initiator device 100 does not receive the AFC from the target device 200 until expiry of the replay timer. At S202, the transmitter 110 of the initiator device 100 transmits the data frame to the receiver 220 of the target device 200. After transmitting the data frame, the initiator device 100 starts the replay timer. At S204, the receiver 220 of the target device 200 receives the data frame and sends the AFC frame to the transmitter 210 of the target device 200. However, the transmitter 210 of the target device 200 does not send the AFC frame to the transmitter 110 of the initiator device 100. Nevertheless, the initiator device 100 still waits for the AFC or a negative Acknowledge (NAC) frame from the target device 200 until the expiry of the replay timer.

Further, when the AFC frame or the NAC frame is not received at the initiator device 100 within the dedicated time period, the initiator device 100 waits for the expiry of the replay timer. As per the UFC specification, the default time of the replay timer is 65535 us, which is considerably high. After expiry of the replay timer, the initiator device 100 assumes there is a problem with the link between the initiator device 100 and the target device 200. Further, the initiator device 100 initiates a link re-initialization between the initiator device 100 and the target device 200 to transmit the data frame from the initiator device 100 to the target device 200. However, up to expiry of the replay timer, the initiator device 100 waits for the AFC frame or NAC frame from the target device 200. Consequently, the initiator device 100 wastes power and resources (e.g., bandwidth).

Further, the initiator device 100 and the target device 200 support multiple speed modes. The speed mode regulates speed of the data frame at the initiator device 100 and the target device 200. The speed mode can be, for example, but not limited to a Pulse Width Modulation Gear 1 (PWM G1) mode, a High Speed Gear 1 (HSG1) mode, a High Speed Gear 2 (HSG2) mode, a High Speed Gear 3 (HSG3) mode, and a High Speed Gear 4 (HSG4) mode. In an example, in the HSG1 mode, speed of the data frame transmission is 1248 Mbps. In another example, in the HSG2 mode, speed of the data frame transmission is 2496 Mbps. The speed mode can be selected by the initiator device 100. Based on the selected speed mode, the data frame transmission time varies. Further, the initiator device 100 can change a timer value of the replay timer for both initiator device 100 and the target device 200 before selecting the speed mode. Hence, the initiator device 100 can set a predefined timer value for the replay timer based on the selected speed mode. A problem with selecting the speed mode and setting the timer value, however, is that the initiator device 100 has to reset the timer value every time there is a speed mode change. Also, the initiator device 100 usually assigns higher reset timer values for the replay timer to avoid a link re-initialization penalty. For example, the actual duration of the timeout period shall be the value set in the Attribute ±10% and a replay timer value is 65535 us.

SUMMARY

Embodiments herein disclose a method for autonomous detection of a status of a link between an initiator device and a target device in an UFS system. The method includes transmitting, by the initiator device, a data frame to the target device through the link. Further, the method includes starting, by the initiator device, a replay timer with a replay time period. Further, the method includes starting, by the initiator device, a turn-around timer with a first time period. The first time period of the turn-around timer is less than the replay time period of the replay timer. Further, the method includes determining, by the initiator device, whether an AFC frame for the data frame is received before expiry of the turn-around timer. Further, the method includes performing, by the initiator device, one of: detecting the status of the link between the initiator device and the target device as active in response to determining that the AFC frame is received from the target device before expiry of the turn-around timer, and detecting the status of the link between the initiator device and the target device by restarting the turn-around timer with a second time period in response to determining that the AFC frame is not received before expiry of the turn-around timer.

In an embodiment, detecting the status of the link between the initiator device and the target device by restarting the turn-around timer with the second time period includes transmitting, by the initiator device, a negative Acknowledgement (NAC) frame to the target device through the link, restarting, by the initiator device, the turn-around timer with the second time period, wherein the second time period of the turn-around timer is less than the time period of the replay timer, determining, by the initiator device, whether one of an AFC frame and an NAC frame is received from the target device before expiry of the restarted turn-around timer, and performing, by the initiator device, one of: detecting the status of the link between the initiator device and the target device as active in response to determining that one of the AFC frame and the NAC frame is received from the target device before expiry of the restarted turn-around timer, and detecting the status of the link between the initiator device and the target device as inactive in response to determining that one of the AFC fame and the NAC frame is not received from the target device before expiry of the restarted turn-around timer, and reinitializing the link between the initiator device and the target device.

In an embodiment, starting, by the initiator device, the turn-around timer with the first time period includes determining, by the initiator device, the first time period for the turn-around timer based on time required for transmission of the data frame from the initiator device to the target device through the link, time required for reception of the AFC frame for the data frame from the target device through the link, and time required to process the data frame at the target device, and starting, by the initiator device, the turn-around timer by configuring the first time period.

In an embodiment, the time required for transmission of the data frame from the initiator device to the target device through the link is determined based on a speed mode configured at the initiator device.

In an embodiment, the time required for reception of the AFC frame for the data frame from the target device to the initiator device through the link is determined based on a speed mode configured at the initiator device.

In an embodiment, restarting, by the initiator device, the turn-around timer with the second time period includes determining, by the initiator device, the second time period for the turn-around timer based on time required for transmission of the NAC frame from the initiator device to the target device through the link, time required for reception of one of the AFC frame and the NAC frame from the target device through the link, and time required to process NAC and prepares the AFC at the target device, and restarting, by the initiator device, the turn-around timer by configuring the second time period.

In an embodiment, the time required for transmission of the NAC frame from the initiator device to the target device through the link is determined based on a speed mode configured at the initiator device.

In an embodiment, the time required for reception of one of the AFC frame and the NAC frame from the target device through the link is determined based on a speed mode configured at the initiator device.

Embodiments herein disclose an initiator device for autonomous detection of a status of a link between the initiator device and a target device in a UFS system. The initiator device includes a UFS memory to store the status of the link and a link status controller connected to the UFS memory. The link status controller is configured to transmit a data frame to the target device through the link. Further, the link status controller is configured to start a replay timer with a replay time period. Further, the link status controller is configured to start a turn-around timer with a first time period. The first time period of the turn-around timer is less than the replay time period of the replay timer. Further, the link status controller is configured to determine whether an AFC frame for the data frame is received before expiry of the turn-around timer. Further, the link status controller is configured to perform one of detect the status of the link between the initiator device and the target device as active in response to determining that the AFC frame is received from the target device before expiry of the turn-around timer, and detect the status of the link between the initiator device and the target device by restarting the turn-around timer with a second time period in response to determining that the AFC frame is not received before expiry of the turn-around timer.

In another aspect, a method for autonomous detection of a status of a link between an initiator device and a target device in a UFS system includes, at the initiator device: transmitting at least one data frame to the target device through the link; starting a replay timer with a replay time period; and starting a turn-around timer with a first time period less than the replay time period. It is then determined whether an AFC frame for the at least one data frame, or a NAC frame, is received before expiry of the turn-around timer; if so, it is detected that the status of the link is active; if not, the turn-around timer is restarted with a second time period that expires prior to the expiry of the replay time period, and the status of the link is detected within the second time period.

In another aspect, a method for autonomous detection of a status of a link between an initiator device and a target device in a universal flash storage system includes: at the initiator device, transmitting at least one data frame to the target device through the link; starting a turn-around timer with a first time period, at a time referenced to the transmission of the at least one data frame; determining whether an AFC frame for the at least one data frame, or a NAC frame, is received before expiry of the turn-around timer; if so, detecting that the status of the link is active; if not, transmitting a NAC frame and restarting the turn-around timer with a second time period, and detecting the status of the link within the second time period, the status being based on whether a response to the transmitted NAC frame is received from the target device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

Embodiments of the method, the initiator device and the UFS system are illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1:
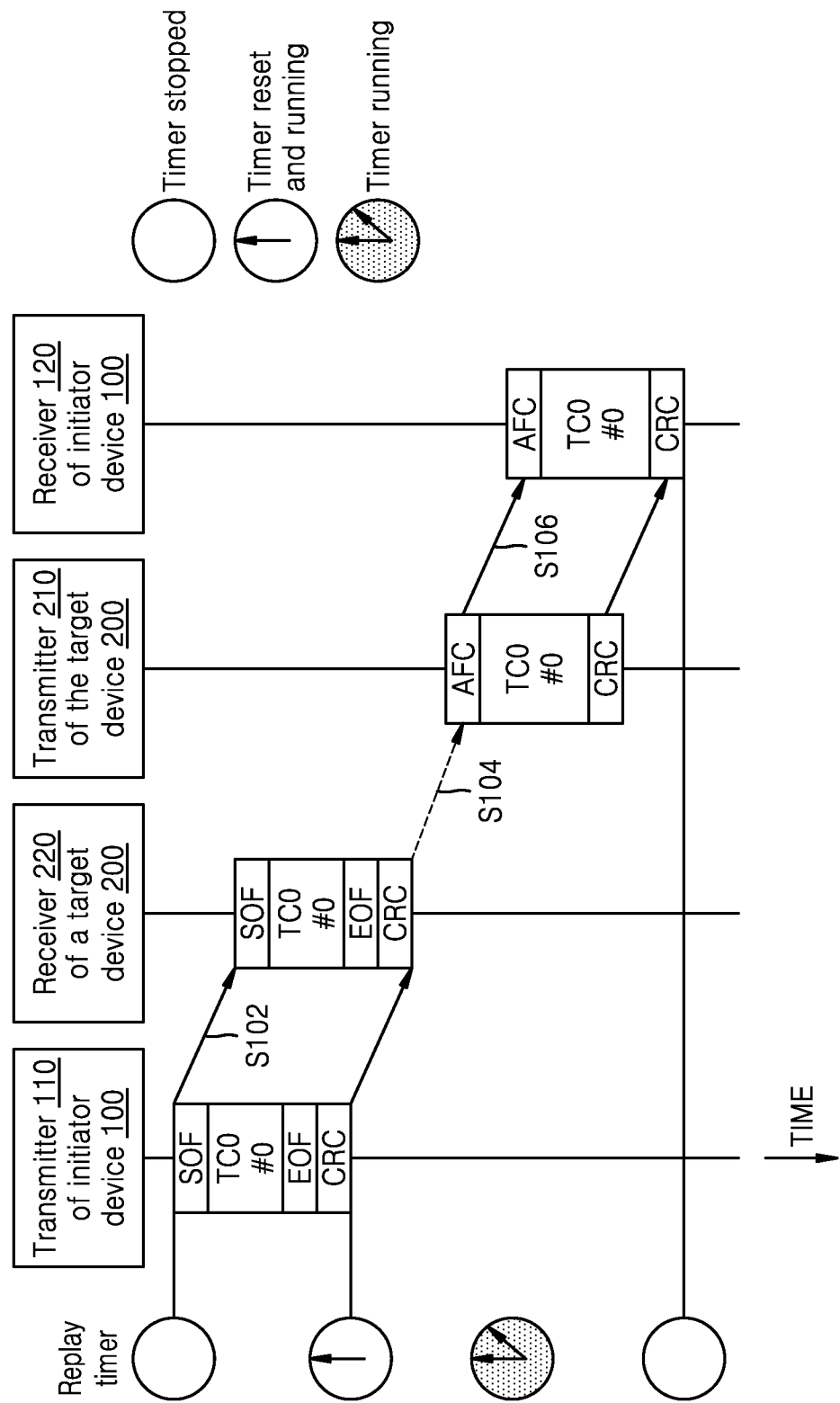
FIG. 1 shows a normal operating scenario in which an initiator device transmits a data frame to a target device and the initiator device receives an AFC from the target device before expiry of the replay timer, according to prior art.
Figure 2:
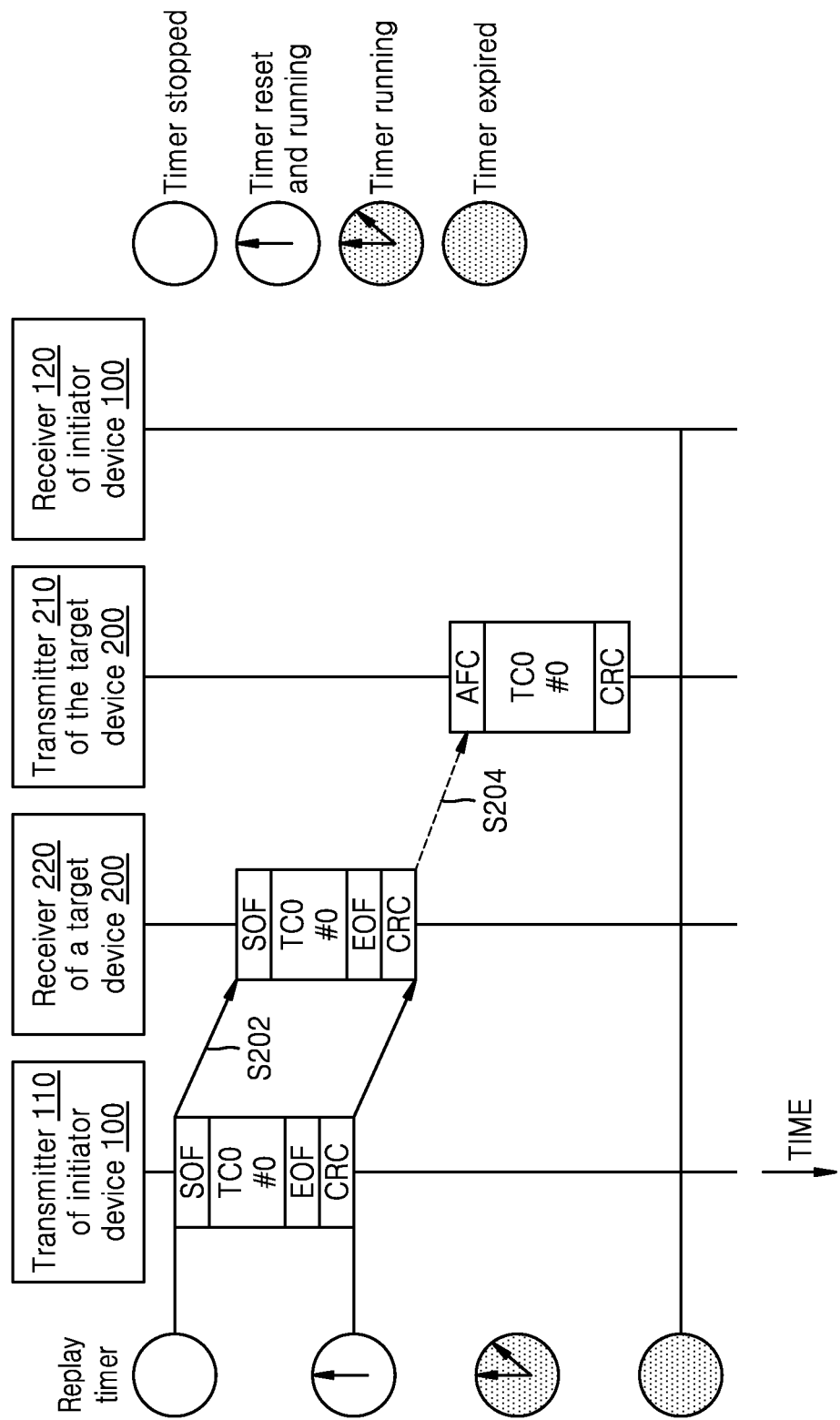
FIG. 2 shows a problem scenario in which the initiator device transmits the data frame to the target device and the initiator device does not receive the AFC from the target device till expiry of the replay timer, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concept. Likewise, the blocks of the embodiments may be physically combined into more complex blocks without departing from the scope of the inventive concept.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Unlike conventional methods and systems, in embodiments of the inventive concept, the initiator device can quickly detect the status of the link between the initiator device and the target device in the UFS system. If the initiator device has not received the AFC frame or a NAC frame before the expiry of the turn-around timer, then, the initiator device sends an NAC frame to the target device and restarts the turn-around timer, so as to initiate/request the target device to send the AFC frame or the NAC frame. Even after sending the NAC frame to the target device, if the initiator device has not received the AFC frame or the NAC frame, before expiry of the restarted turn-around timer, then the initiator device will initiate link re-initialization without waiting for the replay timer expiry. (Conventional systems, by contrast, always wait until the replay timer expires before commencing link re-initialization.) Hence, the initiator device consumes less power and avoids wasting its own resources (e.g., wasting bandwidth or the like), so as improve overall performance of the UFS system.

In embodiments of the inventive concept, after transmitting the NAC frame, the initiator device re-starts the turn-around timer. As per the UFS specification, when the target device receives a NAC frame, the target device should send an AFC frame (if available) as a priority to the initiator device. Further, the target device receives the NAC frame, and the target device sends the AFC frame to the initiator device. In embodiments herein, once the AFC frame is received at the initiator device, the initiator device stops the turn-around timer and initiator device detects that the status of the link between the initiator device and the target device is active. Thus, the initiator device can quickly detect the status of the link between the initiator device and the target device without wasting resources and power, since the initiator device need not wait for the expiry of the replay timer.

Referring now to the drawings, and more particularly to FIGS. 3 through 9, example embodiments are illustrated.

Figure 3:
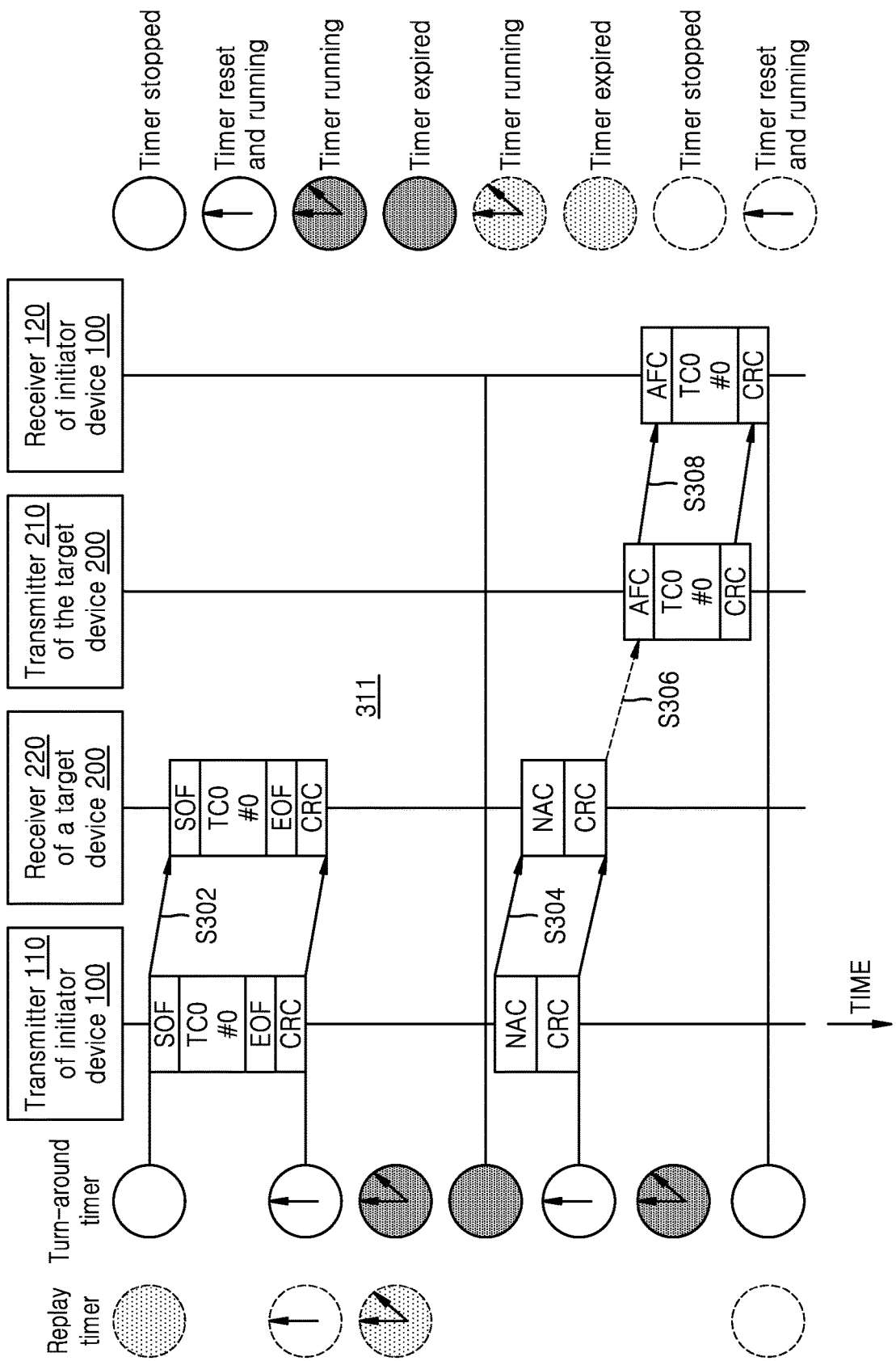
FIG. 3 is a timing diagram illustrating various operations for transmitting the data frame from the initiator device to the target device with a turn-around timer expiry scenario, when the initiator device detects that a status of a link between the initiator device and the target device is active, according to an embodiment as disclosed herein.

FIG. 3 is a timing diagram illustrating various operations of a method for transmitting a data frame from an initiator device 100 to a target device 200 with a turn-around timer expiry scenario, when the initiator device 100 detects that a status of a link between the initiator device 100 and the target device 200 is active, according to an embodiment as disclosed herein. The link can be, for example, but not limited to a wireless communication link, a serial point-to-point link, a transmission line, a copper line, an optical line, and an infrared communication link. A connection between the initiator device 100 and the target device 200 is referred to as the link. The link may support one lane. Each lane representing a set of differential signal pairs (one pair for transmission, one pair for reception). To scale bandwidth, the link may aggregate multiple lanes denoted by xN, where N is any supported link width, such as 1, 2, or 4, or wider.

The initiator device 100 and/or the target device 200 can be a flash storage device. When the initiator device is a flash storage device, the target device may be a processor of an electronic device, such as a computer microprocessor, an image processor, an application processor, an audio processor, and so forth. The initiator device 100 and the target device 200 can be used, e.g., in automotive and fifth generation (5G) applications. The initiator device 100 and the target device 200 may be used in the same electronic device (e.g., smart phone, laptop computer, tablet, flexible device, an internet of things (IoT) device, etc.). The initiator device 100 and the target device 200 may each be an embedded device within the electronic device or may be integrated on a removable card, for flexible use with different electronic devices.

Referring to the FIG. 3, at S302, a transmitter 110 of the initiator device 100 transmits the data frame to a receiver 220 of the target device 200. After transmitting the data frame, the initiator device 100 starts the replay timer and the turn-around timer. In an example, the time period of the replay timer is 65535 us. In the example of FIG. 3, there is no response from the target device 200 to the initiator device 100 in the time period 311 directly following the data frame transmission. Based on the method, at S304, the transmitter 110 of the initiator device 100 transmits an NAC frame to the receiver 220 of the target device 200. After transmitting the NAC, the initiator device 100 starts a turn-around timer. In an example, the time period of the turn-around timer may be 4.57 us for an HS-G1/1-lane configuration. As per the UFS specification (e.g., version 3.1), when the target device 200 receives the NAC frame, the target device 200 should send the AFC frame on a prioritized basis to the initiator device 100. At S306, the receiver 220 of the target device 200 receives the NAC frame and sends the AFC frame to a transmitter 210 of the target device 200. At S308, the transmitter 210 of the target device 200 sends the AFC frame to the transmitter 110 of the initiator device 100. Once the AFC frame is received at the initiator device 100, the initiator device 100 stops the turn-around timer. Hence, the initiator device 100 identifies that the status of the link between the initiator device 100 and the target device 200 is active. Accordingly, based on the method, the initiator device 100 can quickly detect the status of the link between the initiator device 100 and the target device 200 without wasting resources and power, since the initiator device 100 need not wait for the expiry of the replay timer. Consider an example, the time period of the replay timer is 65535 us for HS-G1/1-lane configuration and the time period of the turn-around timer is 4.57 us, then, the total time saving for detecting the status of the link between the initiator device 100 and the target device 200 is 65530.43 us.

Figure 4:
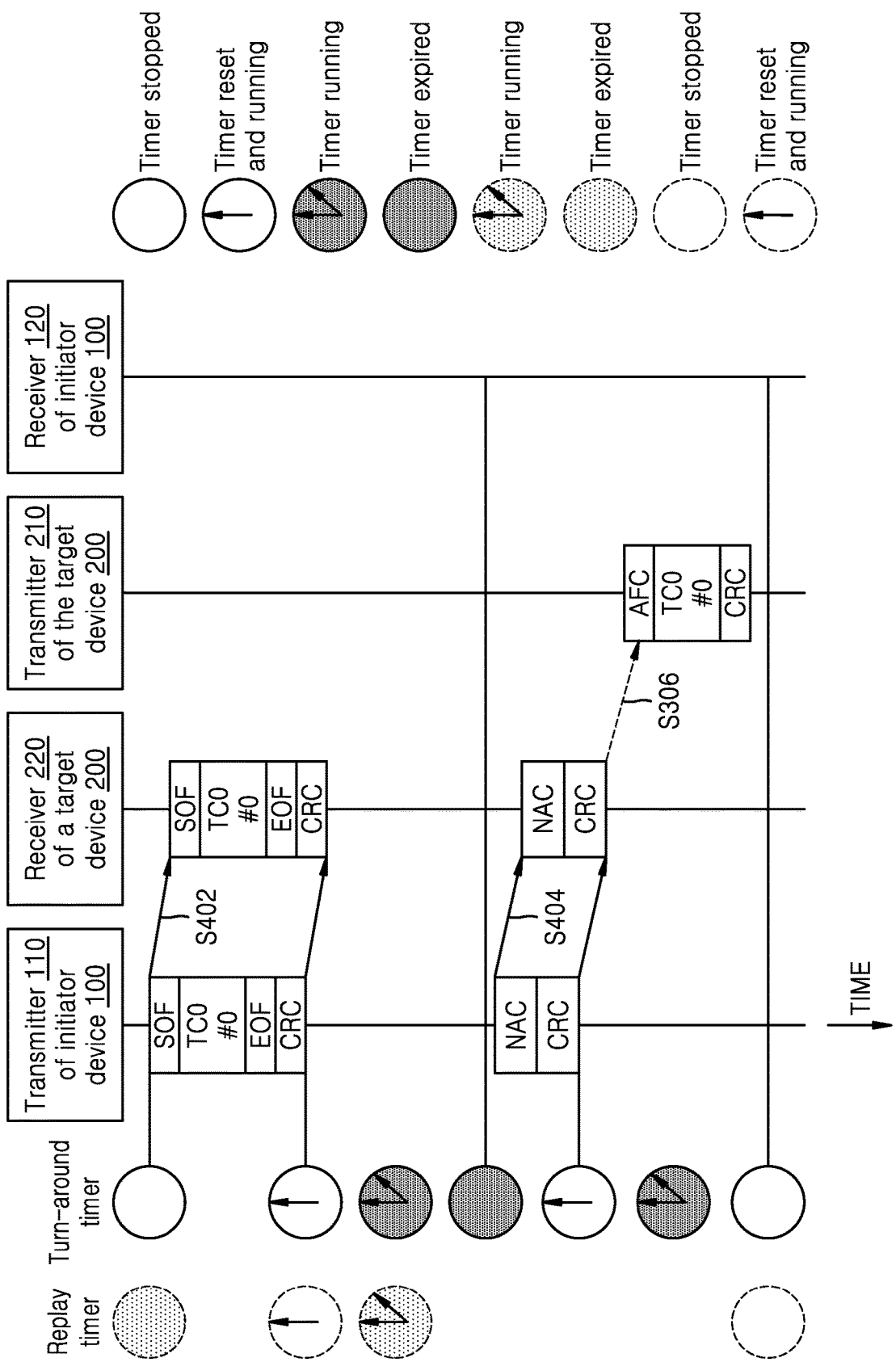
FIG. 4 is a timing diagram illustrating various operations for transmitting the data frame from the initiator device to the target device with a turn-around timer expiry scenario, when the initiator device detects the status of the link between the initiator device and the target device is inactive, according to an embodiment as disclosed herein.

FIG. 4 is a timing diagram illustrating various operations of a method for transmitting the data frame from the initiator device 100 to the target device 200 with a turn-around timer expiry scenario, when the initiator device 100 detects the status of the link between the initiator device 100 and the target device 200 is inactive, according to an embodiment as disclosed herein.

At S402, the transmitter 110 of the initiator device 100 transmits the data frame to the receiver 220 of the target device 200. After transmitting the data frame, the initiator device 100 starts the replay timer and the turn-around timer. However, there is no response from the target device 200 to the initiator device 100. Based on the method, at S404, the transmitter 110 of the initiator device 100 transmits the NAC frame to the receiver 220 of the target device 200. After transmitting the NAC frame, the initiator device 100 re-starts the turn-around timer. As per the UFS specification, when the target device 200 receives a NAC frame, the target device 200 should send the AFC frame as a priority to the initiator device 100. At S406, the receiver 220 of the target device 200 receives the NAC frame, and the receiver 220 of the target device 200 sends the AFC frame to the transmitter 210 of the target device 200. However, the transmitter 210 of the target device 200 does not send the AFC frame to the transmitter 110 of the initiator device 100. If the turn-around timer of the initiator device 100 expires before receiving the AFC frame or the NAC frame from the target device 200, then the initiator device 100 can confirm there is an issue with the link, whereby the initiator device 100 may start the link re-initialization immediately. Note that such link re-initialization begins prior to the time that the replay timer would otherwise expire, since the restarted turn-around timer is designed to expire prior to the expiry of the replay timer. Hence, the initiator device 100 consumes less power and avoids wasting its own resources (e.g., bandwidth wastage or the like), so as improve overall performance of the UFS system. Based on the method, the initiator device 100 can quickly detect the status of the link between the initiator device 100 and the target device 200, since the initiator device 100 need not wait for the expiry of the replay timer.

Figure 5:
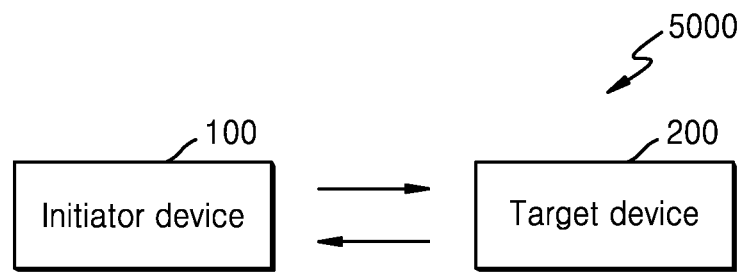
FIG. 5 is a general overview of a UFS system for autonomous detection of the status of the link between the initiator device and the target device, according to an embodiment as disclosed herein.

FIG. 5 is a general overview of the UFS system 5000 for autonomous detection of the status of the link between the initiator device 100 and the target device 200, according to an embodiment as disclosed herein. The UFS system 5000 includes the initiator device 100 and the target device 200. The UFS system 5000 can be a Flash memory system defined by the JEDEC standard, designed for high data transfer speed and low power consumption.

The initiator device 100 is configured to transmit the data frame to the target device 200 through the link. After transmitting the data, the initiator device 100 is configured to start the replay timer with a replay time period. As per the UFS specification (e.g., version 3.1), the default value of the replay timer is 65535 us. Further, the initiator device 100 may be configured to determine a first time period for the turn-around timer based on time required for transmission of the data frame from the initiator device 100 to the target device 200 through the link, time required for reception of the AFC for the data frame from the target device 200 through the link, and time required to process the data frame at the target device 200. The initiator device 100 may be configured to start the turn-around timer based on the configured first time period. In an example, the time required for transmission of the data frame from the initiator device 100 to the target device 200 for HSG4-2 Lanes is as follows:

Total turn-around time=$T1+B=0.186+B$ $T1=t1+t2+t3=0.186$ us[0.136+0.047+0.003]

Note:
1) t1=0.136 us [272 Bytes transmission from initiator to target device through the link]
2) t2=0.047 [6 cycles Internal data frame processing and AFC preparation inside target device (170 MHz)+2 cycles internal AFC reach from initiator PA to initiator DL RX domain (170 Mhz)]
3) t3=0.003 us [AFC reach from target device to initiator device through link].

Further, the initiator device 100 may be configured to determine whether the AFC frame for the data frame is received before expiry of the turn-around timer. If the AFC frame for the data frame is received before expiry of the turn-around timer, then the initiator device 100 detects the status of the link between the initiator device 100 and the target device 200 as active. As discussed earlier, the initiator device 100 can quickly detect the status of the link between the initiator device 100 and the target device 200 as active without wasting resources and power, since the initiator device 100 need not wait for the expiry of the replay timer. If the AFC frame for the data frame is not received before expiry of the turn-around timer, the initiator device 100 is configured to transmit the NAC frame to the target device 200 through the link.

Further, the initiator device 100 may be configured to determine the second time period for the turn-around timer based on the time required for transmission of the NAC frame from the initiator device 100 to the target device 200 through the link, the time required for reception of the AFC and the NAC frame from the target device 200 through the link, and the time required to process the NAC and prepare the AFC at the target device 200. Further, the initiator device 100 may be configured to restart the turn-around timer by configuring the second time period. In an example, the time required for transmission of the NAC frame from the initiator device 100 to the target device 200 for HSG4 2 lanes is as follows:

$2^{nd}$ time timer value=$T1+T2+T3+B$ $T1$=NAC Frame transmission time=0.002 us $T2$=NAC frame decode time=~0.047 us $T3$=AFC Frame Receive time=0.003 us $2^{nd}$ time timer value=0.002+0.047+0.003+$B$ $2^{nd}$ time timer value=0.052+$B$ Total timer value=Timer $1^{st}$ time+Timer $2^{nd}$ time Total timer value=0.186+$B$+0.052+$B$ Total timer value=0.24+2$B$=0.374.

The initiator device 100 may be configured to determine whether the AFC and/or the NAC frame is received from the target device 200 before expiry of the restarted turn-around timer. If the AFC and the NAC frame is received from the target device 200 before expiry of the restarted turn-around timer then, the initiator device 100 is configured to detect the status of the link between the initiator device 100 and the target device 200 as active.

If the AFC frame and the NAC frame is not received from the target device 200 before expiry of the restarted turn-around timer then, the initiator device 100 is configured to detect the status of the link between the initiator device 100 and the target device 200 as inactive. Further, the initiator device 100 is configured to reinitialize the link with the target device 200. The initiator device 100 can quickly detect the status of the link between the initiator device 100 and the target device 200 as inactive without wasting resources and power, since the initiator device 100 toned not wait for the expiry of the replay timer.

Figure 6:
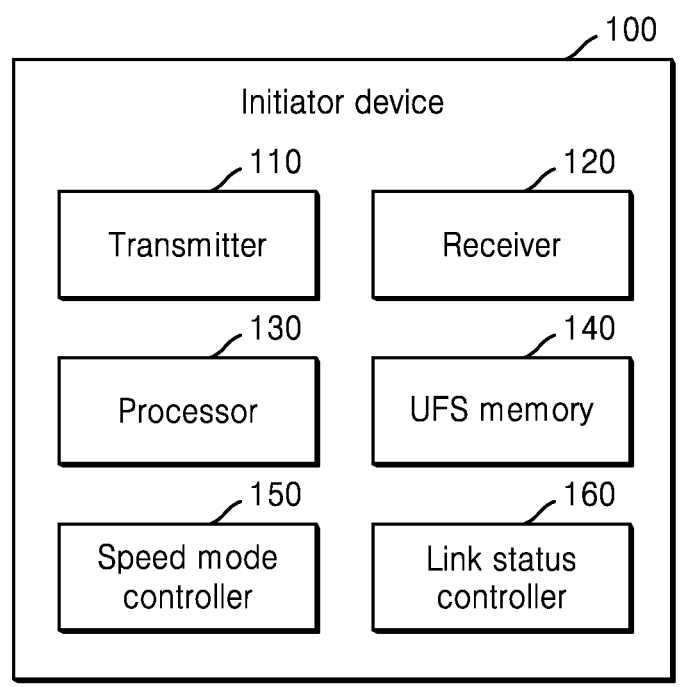
FIG. 6 shows various hardware components of an initiator device for autonomous detection of the status of the link with the target device in the UFS system, according to an embodiment as disclosed herein.

FIG. 6 shows various hardware components of the initiator device 100 for autonomous detection of the status of the link with the target device 200 in the UFS system 5000, according to an embodiment as disclosed herein. The initiator device 100 includes the transmitter 110, the receiver 120, a processor 130, a UFS memory 140, a speed mode controller 150, and a link status controller 160. The processor 130 is coupled with the transmitter 110, the receiver 120, the UFS memory 140, the speed mode controller 150, and the link status controller 160.

The link status controller 160 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The link status controller 160 may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block.

The link status controller 160 is configured to transmit the data frame to the target device 200 through the link. After transmitting the data, the link status controller 160 is configured to start the replay timer with the replay time period. As per the UFS specification, the replay time period is 65535 us. Further, the link status controller 160 is configured to determine the first time period for the turn-around timer based on the time required for transmission of the data frame from the initiator device 100 to the target device 200 through the link, the time required for reception of the AFC frame for the data frame from the target device 200 through the link, and the time required to process the data frame at the target device 200. The link status controller 160 is configured to start the turn-around timer based on the first time period.

Further, the link status controller 160 is configured to determine whether the AFC frame for the data frame is received on or before expiry of the turn-around timer. If the AFC frame for the data frame is received before expiry of the turn-around timer then, the initiator device 100 may detect the status of the link between the initiator device 100 and the target device 200 as active. If the AFC frame for the data frame is not received before expiry of the turn-around timer, the link status controller 160 is configured to transmit the NAC frame to the target device 200 through the link.

Further, the initiator device 100 is configured to determine the second time period for the turn-around timer based on the time required for transmission of the NAC frame from the initiator device 100 to the target device 200 through the link, the time required for reception of the AFC frame and the NAC frame from the target device 200 through the link, and the time required to process the NAC and prepares the AFC at the target device 200. Further, the link status controller 160 is configured to restart the turn-around timer based on the configured second time period.

The link status controller 160 is configured to determine whether the AFC and/or the NAC frame is received from the target device 200 before expiry of the restarted turn-around timer. If the AFC and the NAC frame is received from the target device 200 before expiry of the restarted turn-around timer then, the link status controller 160 detects the status of the link between the initiator device 100 and the target device 200 as active.

If the AFC and the NAC frame is not received from the target device 200 on or before expiry of the restarted turn-around timer then, the link status controller 160 detects the status of the link between the initiator device 100 and the target device 200 as inactive. Further, the link status controller 160 is configured to reinitialize the link with the target device 200.

The time required for transmission of the data frame from the initiator device 100 to the target device 200 through the link may be determined based on a speed mode configured at the initiator device 100 using the speed mode controller 150. Further, the time required for reception of the AFC for the data frame from the target device 200 to the initiator device 100 through the link may be determined based on a speed mode configured at the initiator device 100 using the speed mode controller 150. In an example, if the speed mode is a HSG1, a speed for the HSG1 is 1248 Mbps, and total number of lanes in the initiator device 100 is 1 then a value of the turn-around timer is 4.57 us. Below, table 1 and table 2 indicate various values of the turn-around timer at different speeds.

Saving in 1 Lane Data Transmission:

TABLE 1

| Power Mode | Speed | Lanes | Time value of replay timer | Time value of Turnaround timer | Time saving |
|---|---|---|---|---|---|
| PWM G1 | 3 Mbps | 1 | 65535 us | 1866.76 us | 63668.24 us |
| HSG1 | 1248 Mbps | 1 | 65535 us | 4.57 us | 65530.43 us |
| HSG2 | 2496 Mbps | 1 | 65535 us | 2.48 us | 65532.52 us |
| HSG3 | 4992 Mbps | 1 | 65535 us | 1.21 us | 65533.79 us |
| HSG4 | 9984 Mbps | 1 | 65535 us | 0.654 us | 65534.34 us |

Saving in 2 Lanes Data Transmission:

TABLE 2

| Power Mode | Speed | Lanes | Value of replay timer | Value of Turnaround timer | Time saving |
|---|---|---|---|---|---|
| PWM G1 | 3 Mbps | 2 | 65535 us | 933.43 us | 64600.57 us |
| HSG1 | 1248 Mbps | 2 | 65535 us | 2.328 us | 65532.67 us |
| HSG2 | 2496 Mbps | 2 | 65535 us | 1.21 us | 65533.79 us |
| HSG3 | 4992 Mbps | 2 | 65535 us | 0.654 us | 65534.34 us |

TABLE 2-continued

| Power Mode | Speed | Lanes | Value of replay timer | Value of Turnaround timer | Time saving |
|---|---|---|---|---|---|
| HSG4 | 9984 Mbps | 2 | 65535 us | 0.374 us | 65534.62 us |

The processor 130 is configured to execute instructions stored in the UFS memory 140 and to perform various processes. The processor 130 may include one or more processors. The one or more processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor 130 may include multiple cores and is configured to execute the instructions stored in the UFS memory 140.

The one or more processors control the processing of the input data in accordance with a predefined operating rule or artificial intelligence (AI) model stored in the non-volatile memory and the volatile memory. The predefined operating rule or artificial intelligence model is provided through training or learning.

The UFS memory 140 also stores instructions to be executed by the processor 130. The UFS memory 140 stores the status of the link. The UFS memory 140 may include non-volatile storage elements. In addition, the UFS memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 can be configured to store larger amounts of information. In certain examples, a non-transitory storage medium may store data that can, over time, change (e.g., in Random Access Memory (RAM) or cache).

The transmitter 110 is configured for communicating internally between internal hardware components and with external devices via one or more networks. The communicator 120 can be, for example, but not limited to a Bluetooth communicator, a Wireless fidelity (Wi-Fi) module, and a Li-Fi module. The receiver 120 is configured for communicating internally between internal hardware components and with external devices via one or more networks. The communicator 120 can be, for example, but not limited to a Bluetooth communicator, a Wireless fidelity (Wi-Fi) module, and a Li-Fi module.

Further, initiator device 100 also comprises memory core, which may include one or more banks, arrays, and/or other organization of the memory cells, e.g., designed using Flash memory technology such as NAND Flash memory cells.

Although FIG. 6 shows various hardware components of the initiator device 100 but it is to be understood that other embodiments are not limited thereon. In other embodiments, the initiator device 100 may include more or fewer components. Further, the labels or names of the components are used only for illustrative purpose and does not limit the scope of the inventive concept. One or more components can be combined together to perform the same or substantially similar function for autonomous detection of the status of the link between the initiator device 100 and the target device 200 in the UFS system.

Figure 7:
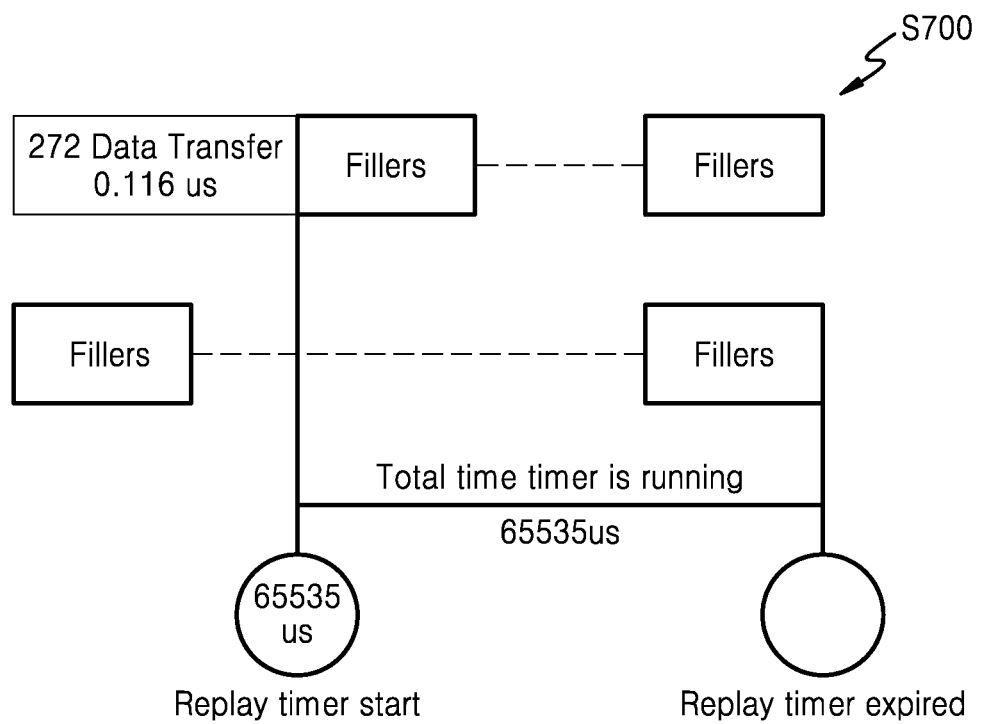
FIG. 7 is an example illustration in which a replay time period of a replay timer is computed, according to prior art.

FIG. 7 is an example illustration in which the replay time period of the replay timer is computed, according to prior art. In an example, 272 bits of data are transferred between the initiator device 100 and the target device 200. The initiator device 100 and the target device 200 supports HSG4-2 lanes (i.e., 11660 Mbps per lane). Based on the UFS specification, a default value of the replay timer is 65535 us.

Figure 8:
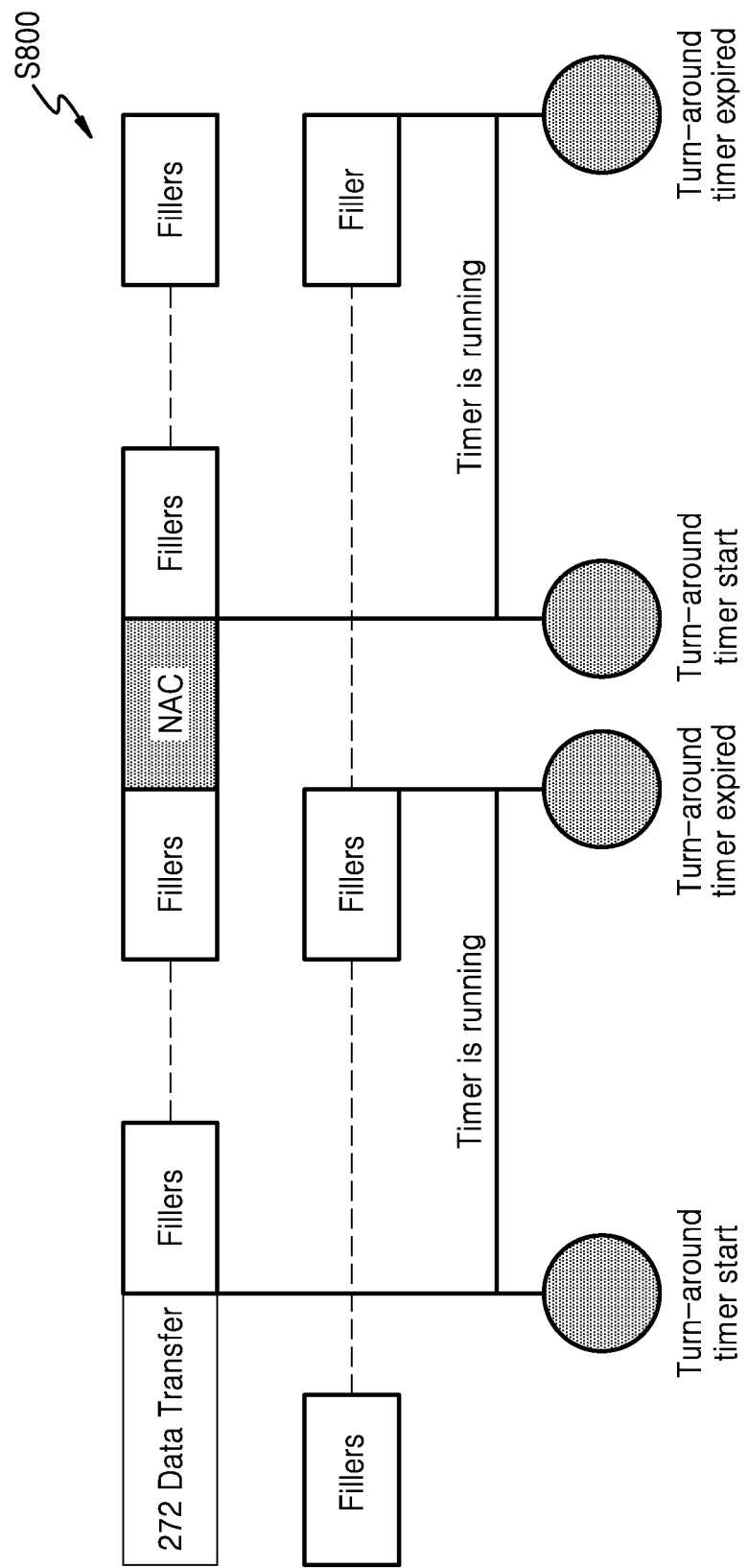
FIG. 8 is an example illustration in which a time period of a turn-around timer is computed, according to an embodiment as disclosed herein.

FIG. 8 is an example illustration in which a time period of the turn-around timer is computed, according to an embodiment as disclosed herein. In an example, 272 bits of data is to be transferred between the initiator device 100 and the target device 200. The initiator device 100 and the target device 200 supports HSG4-2 lanes (i.e., 11660 Mbps per lane).

The initiator device 100 determines the first time period for the turn-around timer based on the time required for transmission of the data frame from the initiator device 100 to the target device 200 through the link, the time required for reception of the AFC for the data frame from the target device 200 through the link, and the time required to process the data frame at the target device 200. The initiator device 100 starts the turn-around timer by configuring the first time period.

The initiator device 100 determines the second time period for the turn-around timer based on the time required for transmission of the NAC frame from the initiator device 100 to the target device 200 through the link, the time required for reception of the AFC and the NAC frame from the target device 200 through the link, and the time required to process the NAC and prepares the AFC at the target device 200. The initiator device 100 restarts the turn-around timer by configuring the second time period.

Figure 9A:
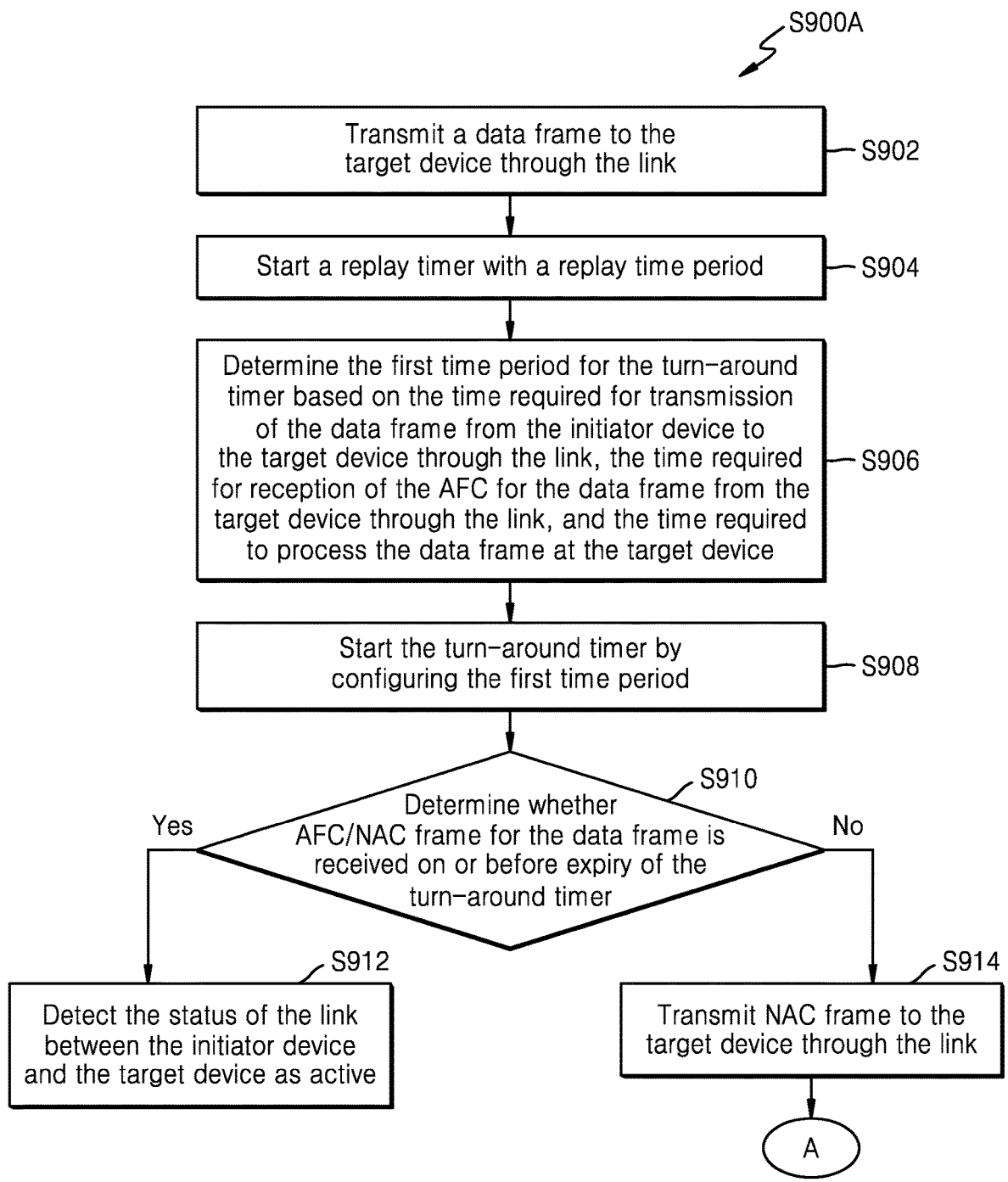
FIG. 9A is a flow diagram illustrating a first part of a method for autonomous detection of the status of the link between the initiator device and the target device in a UFS system, according to an embodiment as disclosed herein.
Figure 9B:
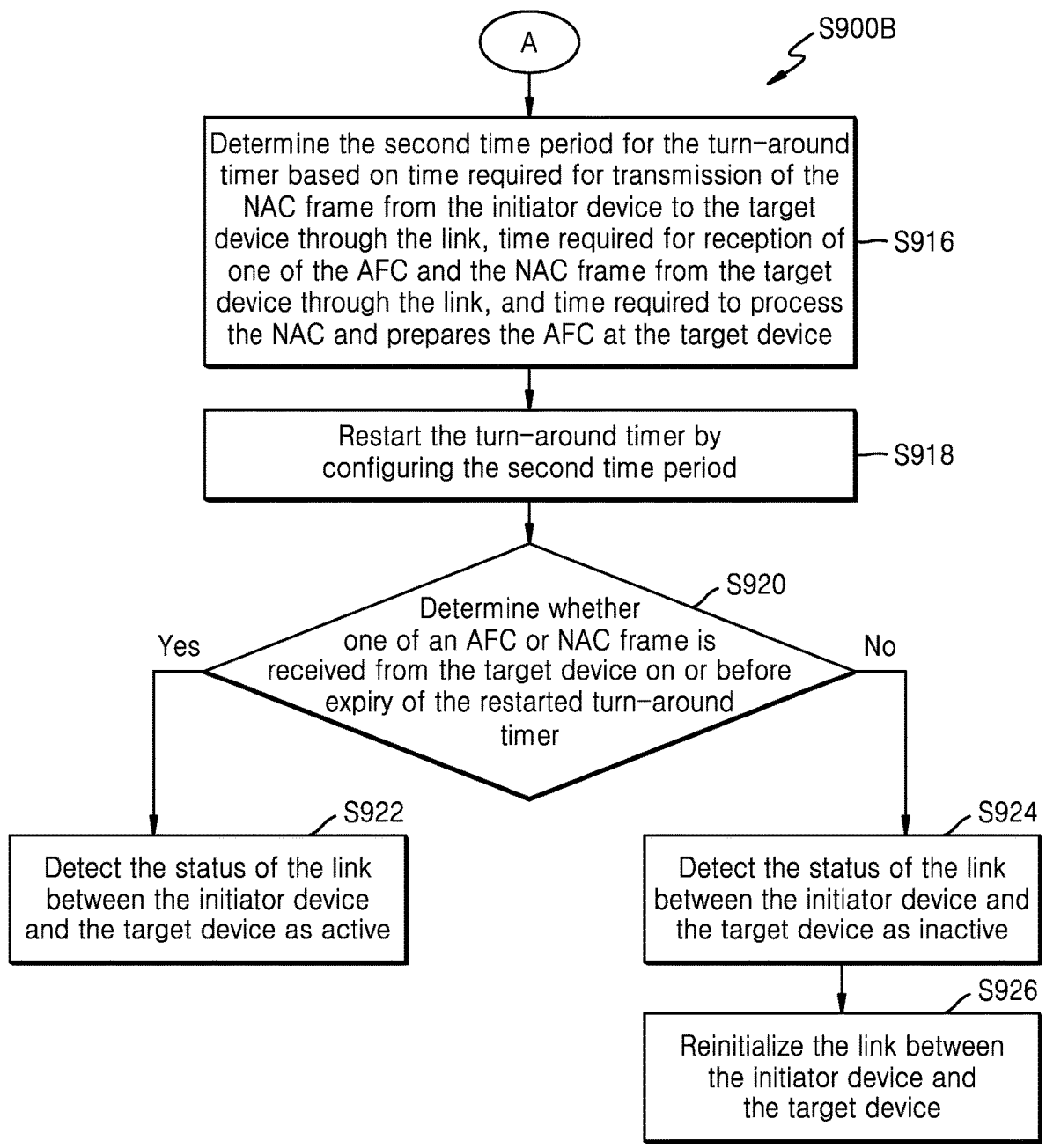
FIG. 9B is a flow diagram illustrating a second part of a method for autonomous detection of the status of the link between the initiator device and the target device in a UFS system, according to an embodiment as disclosed herein.

FIG. 9 is a flow diagram of a first part of a method, S900A, for autonomous detection of the status of the link between the initiator device 100 and the target device 200 in the UFS system (5000), according to an embodiment as disclosed herein. FIG. 9B is a flow diagram of a second part of a method, S900B for such autonomous detection. The operations S902-S930 of FIGS. 9A-9B are performed by the link status controller 160.

At S902, the method includes transmitting the data frame to the target device 200 through the link. At S904, the method includes starting the replay timer with the replay time period. At S906, the method includes determining the first time period for the turn-around timer based on the time required for transmission of the data frame from the initiator device 100 to the target device 200 through the link, the time required for reception of the AFC for the data frame from the target device 200 through the link, and the time required to process the data frame at the target device 200. At S908, the method includes starting the turn-around timer by configuring the first time period.

At S910, the method includes determining whether an AFC frame for the data frame is received before expiry of the turn-around timer (alternatively, on or before expiry of the turn-around timer). If the AFC frame for the data frame is received before (or on or before) expiry of the turn-around timer then, at S912, the method includes detecting the status of the link between the initiator device 100 and the target device 200 as active. If the AFC frame for the data frame is received before (or on or before) expiry of the turn-around timer then, at S914, the method includes transmitting the NAC frame to the target device 200 through the link. Herein, "on expiry" of the turn-around timer means immediately after the turn-around timer expires.

At S916, the method includes determining the second time period for the turn-around timer based on the time required for transmission of the NAC frame from the initiator device 100 to the target device 200 through the link, the time required for reception of one of the AFC and the NAC frame from the target device 200 through the link, and the time required to process the NAC and prepares the AFC at the target device 200. At S918, the method includes restarting the turn-around timer by configuring the second time period.

At S920, the method includes determining whether one of the AFC and the NAC frame is received from the target device 200 before (or on or before) expiry of the restarted turn-around timer. If the AFC and the NAC frame is received from the target device 200 on or before expiry of the restarted turn-around timer then, at S922, the method includes detecting the status of the link between the initiator device 100 and the target device 200 as active.

If the AFC and the NAC frame is not received from the target device 200 before (or on or before) expiry of the restarted turn-around timer 200 then, at S924, the method includes detecting the status of the link between the initiator device 100 and the target device 200 as inactive. At S926, the method includes reinitializing the link between the initiator device 100 and the target device 200.

The various actions, acts, blocks, steps, or the like in the flow diagram (S900) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using network management functions running on at least one hardware device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein.

We claim:

1. A method for autonomous detection of a status of a link between an initiator device and a target device in a Universal Flash Storage (UFS) system, comprising:
   at the initiator device of the UFS system:
   transmitting at least one data frame to the target device through the link;
   starting a replay timer with a replay time period;
   starting a turn-around timer of the initiator device with a first time period less than the replay time period;
   determining whether at least one Acknowledgement and Flow Control frame (AFC) for the at least one data frame is received before expiry of the turn-around timer; and
   performing, by the initiator device:
   detecting the status of the link as active in response to determining that the at least one AFC frame is received from the target device before expiry of the turn-around timer, and detecting the status of the link by restarting the turn-around timer with a second time period in response to determining, at least, that the at least one AFC frame was not received before expiry of the turn-around timer.

2. The method as claimed in claim 1, wherein detecting the status of the link by restarting the turn-around timer with a second time period comprises:
transmitting at least one negative acknowledgement (NAC) frame to the target device through the link;
restarting the turn-around timer with the second time period, wherein the second time period is less than the replay time period;
determining whether one of an AFC frame and an NAC frame is received from the target device before expiry of the restarted turn-around timer; and
performing, by the initiator device, one of:
detecting the status of the link between the initiator device and the target device as active in response to determining that one of the AFC frame and the NAC frame is received from the target device before expiry of the restarted turn-around timer, and
detecting the status of the link as inactive in response to determining that neither the AFC frame nor the NAC frame is received from the target device before expiry of the restarted turn-around timer, and reinitializing the link between the initiator device and the target device.

3. The method as claimed in claim 1, wherein starting, by the initiator device, the turn-around timer with the first time period comprises:
determining, by the initiator device, the first time period for the turn-around timer based on a time required for transmission of the at least one data frame from the initiator device to the target device through the link, a time required for reception of the at least one AFC for the at least one data frame from the target device through the link, and a time required to process the at least one data frame at the target device; and
starting, by the initiator device, the turn-around timer by configuring the first time period.

4. The method as claimed in claim 3, wherein the time required for transmission of the at least one data frame from the initiator device to the target device through the link is determined based on a speed mode configured at the initiator device.

5. The method as claimed in claim 3, wherein the time required for reception of the at least one AFC for the at least one data frame from the target device to the initiator device through the link is determined based on a speed mode configured at the initiator device.

6. The method as claimed in claim 2, wherein restarting, by the initiator device, the turn-around timer with the second time period comprises:
determining, by the initiator device, the second time period for the turn-around timer based on time required for transmission of the at least one NAC frame from the initiator device to the target device through the link, the time required for reception of one of the AFC and the NAC frame from the target device through the link, and the time required to process the NAC and prepare the AFC at the target device; and
restarting, by the initiator device, the turn-around timer by configuring the second time period.

7. The method as claimed in claim 6, wherein the time required for transmission of the at least one NAC frame from the initiator device to the target device through the link is determined based on a speed mode configured at the initiator device.

8. The method as claimed in claim 6, wherein the time required for reception of one of the AFC and the NAC frame from the target device through the link is determined based on a speed mode configured at the initiator device.

9. An initiator device for autonomous detection of a status of a link between the initiator device and a target device in a Universal Flash Storage (UFS) system, wherein the initiator device of the UFS system comprises:
a UFS memory to store the status of the link; and
a link status controller, connected to the UFS memory, configured to:
transmit at least one data frame to the target device through the link;
start a replay timer with a replay time period;
start a turn-around timer of the initiator device with a first time period, wherein the first time period of the turn-around timer is less than the replay time period;
determine whether at least one Acknowledgement and Flow Control frame (AFC) for the at least one data frame is received before expiry of the turn-around timer;
detect the status of the link between the initiator device and the target device as active in response to determining that the at least one AFC frame is received from the target device before expiry of the turn-around timer; and
detect the status of the link between the initiator device and the target device by restarting the turn-around timer with a second time period in response to determining that the at least one AFC frame is not received before expiry of the turn-around timer.

10. The initiator device as claimed in claim 9, wherein said detect the status of the link between the initiator device and the target device by restarting the turn-around timer with a second time period comprises:
transmit at least one negative acknowledgement (NAC) frame to the target device through the link;
restart the turn-around timer with the second time period, wherein the second time period of the turn-around timer is lesser than the time period of the replay timer;
determine whether one of the AFC frame and an NAC frame is received from the target device before expiry of the restarted turn-around timer; and
perform one of:
detect the status of the link between the initiator device and the target device as active in response to a determination that one of the AFC frame and the NAC frame is received from the target device before expiry of the restarted turn-around timer, and
detect the status of the link between the initiator device and the target device as inactive in response to a determination that neither the AFC frame nor the NAC frame is received from the target device before expiry of the restarted turn-around timer, and reinitializing the link between the initiator device and the target device.

11. The initiator device as claimed in claim 9, wherein said start the turn-around timer with the first time period comprises:
determine the first time period for the turn-around timer based on time required for transmission of the at least one data frame from the initiator device to the target device through the link, time required for reception of the at least one AFC for the at least one data frame from the target device through the link, and time required to process the at least one data frame at the target device; and start the turn-around timer by configuring the first time period.

12. The initiator device as claimed in claim 11, wherein the time required for transmission of the at least one data frame from the initiator device to the target device through the link is determined based on a speed mode configured at the initiator device.

13. The initiator device as claimed in claim 11, wherein the time required for reception of the at least one AFC for the at least one data frame from the target device to the initiator device 100 through the link is determined based on a speed mode configured at the initiator device.

14. The initiator device as claimed in claim 10, wherein said restart the turn-around timer with the second time period comprises:

determine the second time period for the turn-around timer based on the time required for transmission of the at least one NAC frame from the initiator device to the target device through the link, the time required for reception of one of the AFC and the NAC frame from the target device through the link, and the time required to process the NAC and prepares the AFC at the target device; and restart the turn-around timer by configuring the second time period.

15. The initiator device as claimed in claim 14, wherein the time required for transmission of the at least one NAC frame from the initiator device to the target device through the link is determined based on a speed mode configured at the initiator device.

16. The initiator device as claimed in claim 14, wherein the time required for reception of one of the AFC and the NAC frame from the target device through the link is determined based on a speed mode configured at the initiator device.

17. A method for autonomous detection of a status of a link between an initiator device and a target device in a Universal Flash Storage (UFS) system, comprising:

at the initiator device of the UFS system:

transmitting at least one data frame to the target device through the link;

starting a replay timer with a replay time period;

starting a turn-around timer of the initiator device with a first time period less than the replay time period;

determining whether an Acknowledgement and Flow Control frame (AFC) for the at least one data frame, or a negative acknowledgement (NAC) frame, is received before expiry of the turn-around timer; if so, detecting that the status of the link is active; if not, restarting the turn-around timer with a second time period that expires prior to the expiry of the replay time period and detecting the status of the link within the second time period.

18. The method of claim 17, further comprising stopping the restarted turn-around timer when an AFC frame or NAC frame is received during the second time period.

19. The method of claim 17, further comprising re-initializing the link when the restarted turn-around timer expires after no AFC frame or NAC frame was received during the second time period.

* * * * *